United States Patent
Abe et al.

(10) Patent No.: US 10,359,875 B2
(45) Date of Patent: Jul. 23, 2019

(54) TOUCH SENSOR DEVICE

(71) Applicant: Japan Display Inc., Tokyo (JP)

(72) Inventors: Hiroyuki Abe, Chiba (JP); Masahiro Maki, Mobara (JP); Takayuki Suzuki, Mobara (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 15/896,502

(22) Filed: Feb. 14, 2018

(65) Prior Publication Data

US 2018/0173351 A1   Jun. 21, 2018

Related U.S. Application Data

(63) Continuation of application No. 15/584,069, filed on May 2, 2017, now Pat. No. 9,927,900, which is a (Continued)

(30) Foreign Application Priority Data

May 1, 2012   (JP) .................. 2012-104370

(51) Int. Cl.
*G06F 3/041* (2006.01)
*G02F 1/1333* (2006.01)
(Continued)

(52) U.S. Cl.
CPC .......... *G06F 3/0412* (2013.01); *G02F 1/1345* (2013.01); *G02F 1/13338* (2013.01); (Continued)

(58) Field of Classification Search
CPC .................................................. G06F 3/044
See application file for complete search history.

(56) References Cited

U.S. PATENT DOCUMENTS

| 5,719,530 A | 2/1998 | Shimura et al. |
| 2004/0189915 A1 | 9/2004 | Taguchi et al. |

(Continued)

FOREIGN PATENT DOCUMENTS

| CN | 101681221 A | 3/2010 | |
| JP | 05-072563 | * 3/1993 | ............. G02F 1/136 |

(Continued)

OTHER PUBLICATIONS

Office Action dated Apr. 23, 2015 regarding a corresponding Chinese Patent Application No. 201310101054.2.
(Continued)

*Primary Examiner* — Sang V Nguyen
(74) *Attorney, Agent, or Firm* — Michael Best & Friedrich LLP

(57) ABSTRACT

The presence or absence of touch is detected according to a difference of a capacitance caused by the presence or absence of a material that blocks the electric field formed between the detection electrode and the common electrode. The common electrode includes a plurality of divided electrode portions that is extended in a lateral direction and aligned with each other in a longitudinal direction. Each of the plurality of common lines is electrically connected to at least one of the divided electrode portions. The plurality of common lines is arranged in an area next to the common electrode in the lateral direction of the common electrode, arranged next to each other in a width direction orthogonal to a length thereof, is different in width from each other, and the width of the common lines is wider as the length is longer.

10 Claims, 14 Drawing Sheets

Related U.S. Application Data continuation of application No. 14/829,996, filed on Aug. 19, 2015, now Pat. No. 9,671,639, which is a continuation of application No. 13/851,184, filed on Mar. 27, 2013, now Pat. No. 9,146,412.

(51) Int. Cl.
  *G02F 1/1345* (2006.01)
  *G06F 3/044* (2006.01)
  *G02F 1/1343* (2006.01)
  *G02F 1/1362* (2006.01)

(52) U.S. Cl.
  CPC .. *G02F 1/134363* (2013.01); *G02F 1/136286* (2013.01); *G06F 3/044* (2013.01); *G06F 3/0418* (2013.01); *G02F 2001/134318* (2013.01); *G02F 2201/121* (2013.01)

(56) References Cited

U.S. PATENT DOCUMENTS

| | | | |
|---|---|---|---|
| 2005/0046777 A1 | 3/2005 | Moon | |
| 2005/0127830 A1 | 6/2005 | Heo et al. | |
| 2007/0002243 A1 | 1/2007 | Kim | |
| 2007/0262966 A1 | 11/2007 | Nishimura et al. | |
| 2010/0000765 A1 | 1/2010 | Hirakata et al. | |
| 2010/0182273 A1* | 7/2010 | Noguchi | G02F 1/13338 345/174 |
| 2010/0289765 A1 | 11/2010 | Noguchi et al. | |
| 2011/0234957 A1 | 9/2011 | Watanabe et al. | |
| 2012/0146974 A1* | 6/2012 | Murakoso | H01J 11/26 345/208 |
| 2012/0249453 A1 | 10/2012 | Tsukamoto | |

FOREIGN PATENT DOCUMENTS

| | | | | |
|---|---|---|---|---|
| JP | H05-072563 A | | 3/1993 | |
| JP | 08-248440 | * | 9/1996 | ............. G02F 1/136 |
| JP | H08-248440 A | | 9/1996 | |
| JP | H10-062735 A | | 3/1998 | |
| JP | 2006-146895 A | | 6/2006 | |
| JP | 2007-011368 A | | 1/2007 | |
| JP | 2009-265484 A | | 11/2009 | |
| JP | 2010-066542 A | | 3/2010 | |
| JP | 2011-227923 A | | 11/2011 | |
| JP | 2011-233018 A | | 11/2011 | |
| JP | 2012-047801 A | | 3/2012 | |
| JP | 2012-053924 | * | 3/2012 | ............. G06G 3/044 |
| JP | 2012-053924 A | | 3/2012 | |
| TW | 200945149 A | | 11/2009 | |
| WO | 2012/039290 A1 | | 3/2012 | |

OTHER PUBLICATIONS

Office Action dated May 26, 2014 regarding a corresponding Korean Patent Application No. 10-2013-33334.

Office Action dated Feb. 6, 2015 regarding a corresponding Taiwanese Patent Application No. 102111038.

Japanese Office Action dated Jul. 4, 2017 for the corresponding JP Patent Application No. 2016-157720.

Japanese Office Action dated Jul. 3, 2018 for corresponding Japanese Patent Application No. 2017-212529, with machine translation.

* cited by examiner

TOUCH SENSOR DEVICE

CROSS-REFERENCE TO RELATED APPLICATIONS

This application is a continuation of U.S. patent application Ser. No. 15/584,069 filed on May 2, 2017, which in turn, is a continuation of U.S. patent application Ser. No. 14/829,996 (now U.S. Pat. No. 9,671,639), filed on Aug. 19, 2015, which in turn, is a continuation of U.S. patent application Ser. No. 13/851,184 (now U.S. Pat. No. 9,146,412), filed on Mar. 27, 2013, which claims the priority of Japanese Patent Application No. 2012-104370 filed on May 1, 2012, the contents of which are hereby incorporated by reference into this application.

BACKGROUND OF THE INVENTION

1. Field of the Invention

The present invention relates to a liquid crystal display device with a built-in touch panel.

2. Description of the Related Art

In diffusion of mobile devices, a touch panel technique for supporting a graphical user interface is important. As a touch panel of a capacitive coupling type has been known as the touch panel technique. In the general touch panel of the capacitive coupling type, a touch panel substrate in which a surface of a glass substrate is subjected to conductive coating (transparent conductive film)) is provided, and touched with a finger to implement position detection. Also, a liquid crystal display panel with a touch panel has been known in which the touch panel substrate is fitted to the liquid crystal display panel, and a menu screen displayed on the liquid crystal display panel is touched with the finger to implement operation according to a menu (refer to JP 2006-146695 A)

In the display panel with the touch panel, the touch panel is put on a display area surface of the display panel on which information on images or characters is displayed in use. In the related-art display panel with the touch panel, the touch panel and the display panel are manufactured, separately, and put on each other in combination as a final product. For that reason, in the related-art display panel with the touch panel, because there is a need to stack the touch panel and the display panel which are manufactured, separately, on each other, there arise such problems that the display panel with the touch panel is thickened, and a countermeasure against misalignment of stacking is necessary.

SUMMARY OF THE INVENTION

An object of the present invention is to provide a liquid crystal display device with a built-in touch panel in which the touch panel is incorporated into the display device to enable the display device to be thinned as compared with the related art one, and to require no countermeasure against the misalignment of stacking.

(1) According to the present invention, there is provided a liquid crystal display device with a built-in touch panel, including: a liquid crystal material; a first substrate and a second substrate between which the liquid crystal material is held; pixel electrodes formed between the first substrate and the second substrate; a common electrode formed between the first substrate and the second substrate; a detection electrode formed on the first substrate; and a plurality of common lines formed on the second substrate so as to be electrically connected to the common electrode, in which the liquid crystal material is driven by an electric field formed between the pixel electrodes and the common electrode, in which the presence or absence of touch is detected according to a difference of a capacitance caused by the presence or absence of a material that blocks the electric field formed between the detection electrode and the common electrode, in which the common electrode includes a plurality of divided electrode portions that is extended in a lateral direction and aligned with each other in a longitudinal direction, in which each of the plurality of common lines is electrically connected to at least one of the divided electrode portions, in which the plurality of common lines is arranged in an area next to the common electrode in the lateral direction of the common electrode, arranged next to each other in a width direction orthogonal to a length thereof, is different in width from each other, and the width of the common lines is wider as the length is longer. According to the present invention, the touch panel is configured by the first substrate, the detection electrode, and the common electrode, and the touch panel is incorporated into the liquid crystal display device. As a result, the device can be thinned more than the related-art one, and no countermeasure against the misalignment of stacking those components on each other is required. Also, since the plurality of common lines is formed so that the width is wider as the length is longer, a difference in the resistance value caused by a difference of the lengths can be reduced.

(2) In the liquid crystal display device with a built-in touch panel according to the item (1), each of the plurality of common lines has one end thereof in the area next to the common electrode in the lateral direction, and extends from the one end in an extension direction which is one of the vertical directions, and one ends of the plurality of common lines are positionally displaced in the extension direction in the order from the longest common line to the shortest common line.

(3) In the liquid crystal display device with a built-in touch panel according to the item (2), the shortest common line is arranged at a side closest to the common electrode in the lateral direction, and the longest common line is arranged at a side farthest from the common electrode in the lateral direction, and the plurality of common lines is more distant from the common electrode in the lateral direction as the length of the common lines is longer.

(4) In the liquid crystal display device with a built-in touch panel according to the item (3), except for at least the shortest common line, the respective common lines 58 each have a plurality of portions different in width along the length direction, the number of the plurality of common lines is n, and in a longitudinal side area that is adjacent to the one end of an m $(1 \le m)^{th}$ common line from the shortest common line on an upper side in the extension direction, and extends in a width direction, $(m+1)^{th}$ to $n^{th}$ common lines are arranged in parallel, and in a lateral side area that is adjacent to the one end of the m $(1 \le m)^{th}$ common line from the shortest common line in the lateral direction, the $(m+1)^{th}$ to $n^{th}$ common lines are arranged in parallel. The longitudinal side area is wider in the lateral direction than the lateral side area, and in the $(m+1)^{th}$ to $n^{th}$ common lines, the width of a portion situated in the vertical side area is wider than the width of a portion situated in the lateral side area.

(5) In the liquid crystal display device with a built-in touch panel according to the item (4), a difference of the width in the lateral direction between the longitudinal side area and the lateral side area is equal to a width of the one end of the $m^{th}$ common line in the lateral direction.

(6) In the liquid crystal display device with a built-in touch panel according to the item (5), a difference between a total of the widths of the portions of the $(m+1)^{th}$ to $n^{th}$ common lines provided in the longitudinal side area, and a total of the widths of the portions of the $(m+1)^{th}$ to $n^{th}$ common lines provided in the lateral side area is equal to the width of the one end of the $m^{th}$ common line in the lateral direction.

(7) In the liquid crystal display device with a built-in touch panel according to any one of the items (1) to (6), each of the plurality of common lines is electrically connected to two or more of the divided electrode portions.

(8) In the liquid crystal display device with a built-in touch panel according to any one of the items (1) to (6), each of the plurality of common lines is electrically connected to one of the divided electrode portions.

(9) In the liquid crystal display device with a built-in touch panel according to any one of the items (1) to (8), each of the plurality of common lines is electrically connected to the at least one of the divided electrode portions by at least one connection portion.

(10) In the liquid crystal display device with a built-in touch panel according to the item (9), the number of the at least one connection portion is larger as the length of the one common line electrically connected thereto is larger.

(11) In the liquid crystal display device with a built-in touch panel according to the item (9) or (10), a length of the at least one connection portion is longer as the length of the one common line electrically connected thereto is shorter.

(12) In the liquid crystal display device with a built-in touch panel according to any one of the items (9) to (11), the at least one connection portion is thinner as the length of the one common line electrically connected thereto is shorter.

(13) In the liquid crystal display device with a built-in touch panel according to any one of the items (1) to (12), the second substrate further includes a circuit, and the plurality of common lines is formed to overlap with the circuit.

(14) In the liquid crystal display device with a built-in touch panel according to anyone of the items (1) to (13), the pixel electrodes and the common electrode are formed on the second substrate, and the electric field formed between the pixel electrodes and the common electrode is a lateral electric field.

DETAILED DESCRIPTION OF THE INVENTION

Figure 1:
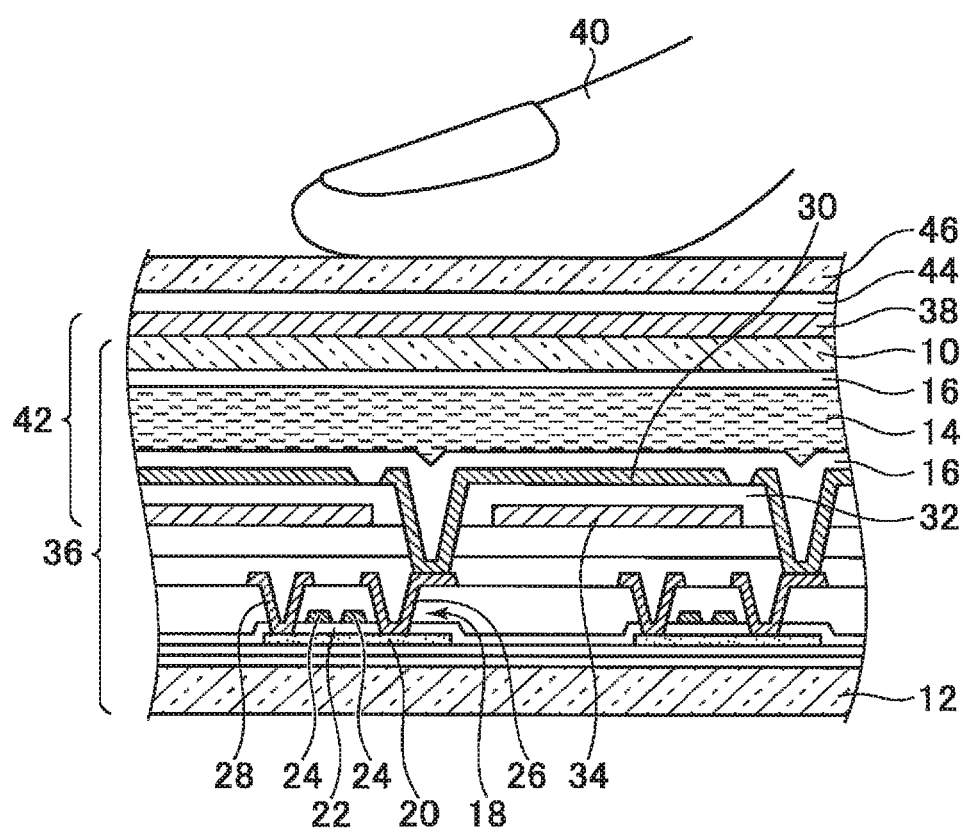
FIG. 1 is a cross-sectional view of a liquid crystal display device with a built-in touch panel according to an embodiment of the present invention.

FIG. 1 is a cross-sectional view of a liquid crystal display device with a built-in touch panel according to an embodiment of the present invention. The liquid crystal display device with the built-in touch panel includes a first substrate 10 and a second substrate 12. A liquid crystal material 14 is disposed between the first substrate 10 and the second substrate 12. Oriented films 16 are formed between the first substrate 10 and the second substrate 12 to sandwich the liquid crystal material 14 therebetween.

The first substrate 10 is made of a light transmissive material (for example, glass). The first substrate 10 is formed of a color filter substrate on which a colored layer and a black matrix not shown in the drawing are formed. On the first substrate 10 is formed the oriented film 16. The oriented film 16 is formed on the colored layer and the black matrix not shown in the drawing.

The second substrate 12 is made of a light transmissive material (for example, glass). On the second substrate 12 is formed thin film transistors 18, and therefore the second substrate 12 is also called "TFT substrate". Each of the thin film transistors 18 includes a semiconductor film 20 made of polysilicon or the like, a gate insulating film 22 that covers the semiconductor film 20, gate electrodes 24 arranged above the semiconductor film 20 through the gate insulating film 22, and a source electrode 26 and a drain electrode 28 which are electrically connected to the semiconductor film 20 through the gate insulating film 22.

One of the source electrode 26 and the drain electrode 28 is electrically connected to the pixel electrodes 30. Also, a common electrode 34 is formed in a layer position different from that of pixel electrodes 30 through an insulating film 32. In an example of FIG. 1, the pixel electrodes 30 are located above the common electrode 34 (a side distant from the second substrate 12), but those electrodes may be arranged upside down.

The above components configure a liquid crystal display panel 36, and the liquid crystal material 14 is driven by an electric field developed between the pixel electrodes 30 and the common electrode 34. Since the pixel electrodes 30 and the common electrode 34 are formed over the second substrate 12, the electric field developed between the pixel electrodes 30 and the common electrode 34 is a lateral electric field. Alternatively, the pixel electrodes 30 may be formed over the second substrate 12, the common electrode 34 may be formed over the first substrate 10, and the liquid crystal material 14 may be driven by a longitudinal electric field. In any configurations, the pixel electrodes 30 and the common electrode 34 may be arranged between the first substrate 10 and the second substrate 12.

The liquid crystal display device with a built-in touch panel has a detection electrode 38 formed on the first substrate 10. In the example of FIG. 1, the detection electrode 38 is arranged on a surface of the first substrate 10 opposite to the liquid crystal material 14. The respective different voltages are applied to the detection electrode and the common electrode 34 to form an electric field (fringe electric field) therebetween (in detail, outside of an opposed area). The presence or absence of touch is detected according to a difference in the capacitance depending on the presence or absence of a material (for example, a finger 40) that blocks the electric field developed between the detection electrode 38 and the common electrode 34. That is, a touch panel 42 is configured by the first substrate 10, the detection electrode 38 and the common electrode 34. A front panel 46 is attached to the touch panel 42 through an adhesive layer 44 for reinforcement. According to this embodiment, since the touch panel 42 is incorporated into the liquid crystal display device, the device can be thinned more than the related-art one. Also, since the liquid crystal display panel 36 and the touch panel 42 share the first substrate 10, no countermeasure against the misalignment of stacking those components on each other is required.

Figure 2:
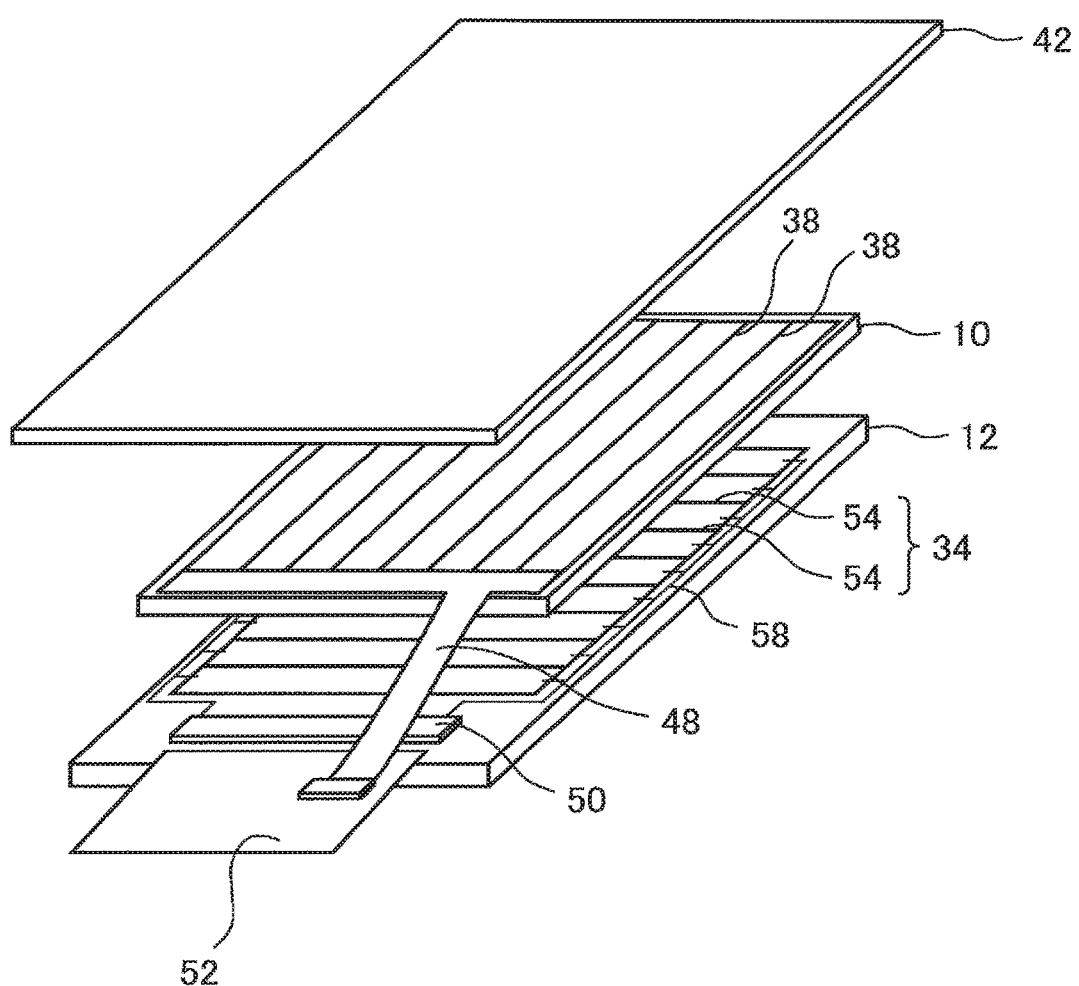
FIG. 2 is an exploded perspective view of a main portion of the liquid crystal display device with a built-in touch panel according to the embodiment of the present invention.

FIG. 2 is an exploded perspective view of a main portion of the liquid crystal display device with the built-in touch panel according to the embodiment of the present invention. The first substrate 10 has a rectangular planar shape, and a plurality of the detection electrodes 38 extends in a longitudinal direction along a long side thereof. The first substrate 10 is fitted with a flexible wiring substrate 48 for electric connection between the detection electrode 38 and the external portion. An integrated circuit chip 50 incorporating a liquid crystal driver circuit is mounted on the second substrate 12, and a flexible wiring substrate 52 is fitted to the second substrate 12 for electric connection with the external.

Figure 3:
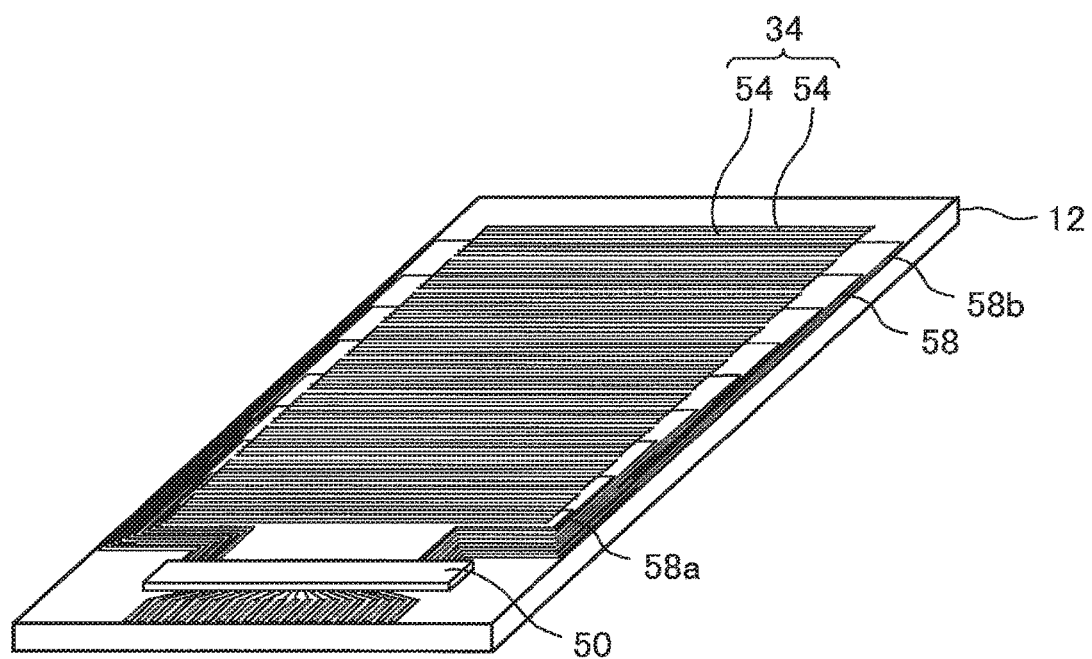
FIG. 3 is a perspective view illustrating the details of a second substrate.

FIG. 3 is a perspective view illustrating the details of the second substrate 12. The common electrode 34 includes a plurality of divided electrode portions 54 extending in a lateral direction and aligned with each other in the longitudinal direction. The second substrate 12 has a rectangular planar shape, and the plurality of divided electrode portions 54 extends in the lateral direction along the short side. The direction along which the plurality of divided electrode portions 54 extends intersects with (for example, is orthogonal to) the direction along which the plurality of detection electrode 38 (FIG. 2) extends.

Figure 4:
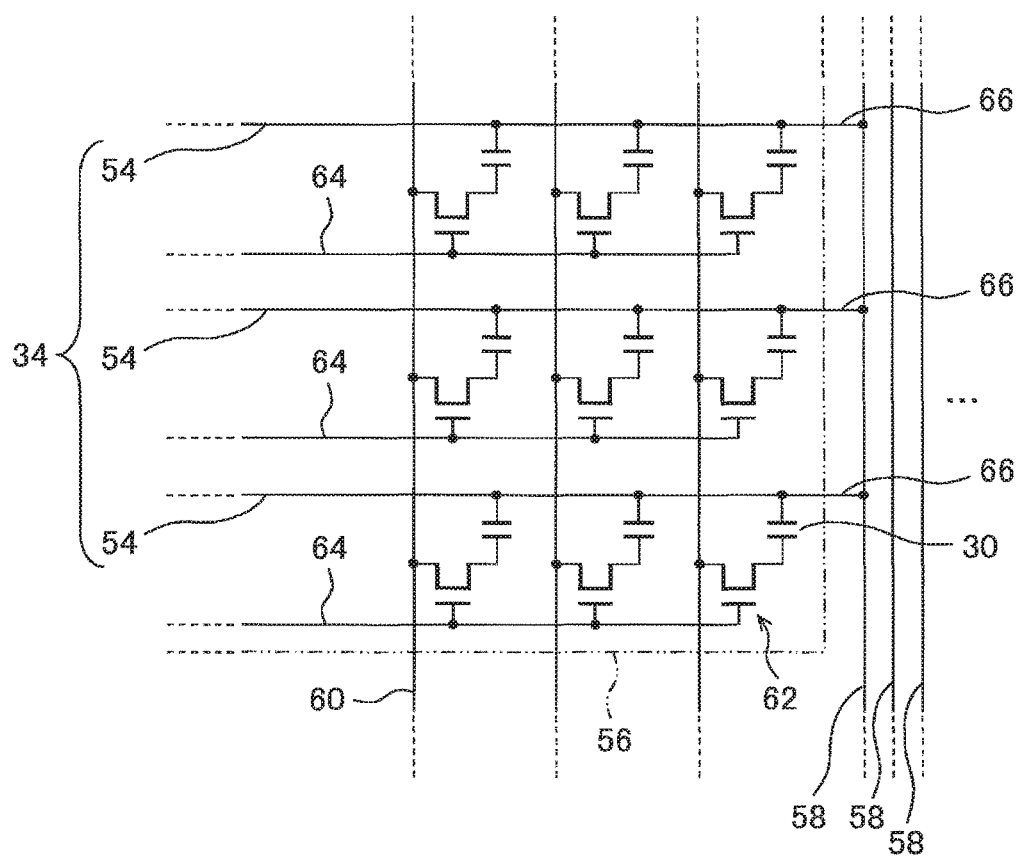
FIG. 4 is a diagram illustrating a circuit for displaying an image on a liquid crystal display panel.

FIG. 4 is a diagram illustrating a circuit for displaying an image on the liquid crystal display panel 36. The pixel electrodes 30 are formed in an image display area 56. Since pixels are formed by the plurality of pixel electrodes 30, an area surrounding the plurality of pixel electrodes 30 represents the image display area 56. In the image display area 56 is formed the common electrode 34 including the plurality of divided electrode portions 54. The potential of the divided electrode portions 54 is set to a reference potential (for example, GND), and a voltage corresponding to the brightness of each pixel is applied to the pixel electrode 30. An image is displayed under the control (for example, drive of the liquid crystal material 14) of the light using the electric field developed between the pixel electrodes 30 and the common electrode 34.

The common electrode 34 is electrically connected to common lines 58, and the pixel electrodes 30 are electrically connected to signal lines 60. A switching element 62 (for example, the thin film transistor 18 illustrated in FIG. 1) is connected between each of the pixel electrodes 30 and each of the signal lines 60 to conduct electric continuity or discontinuity between the pixel electrode 30 and the signal line 60. Each switching element 62 is connected to a scanning line 64 drawn out of a scanning circuit not shown, and driven (turned on/off) according to a scanning signal input to the scanning line 64.

Figure 5:
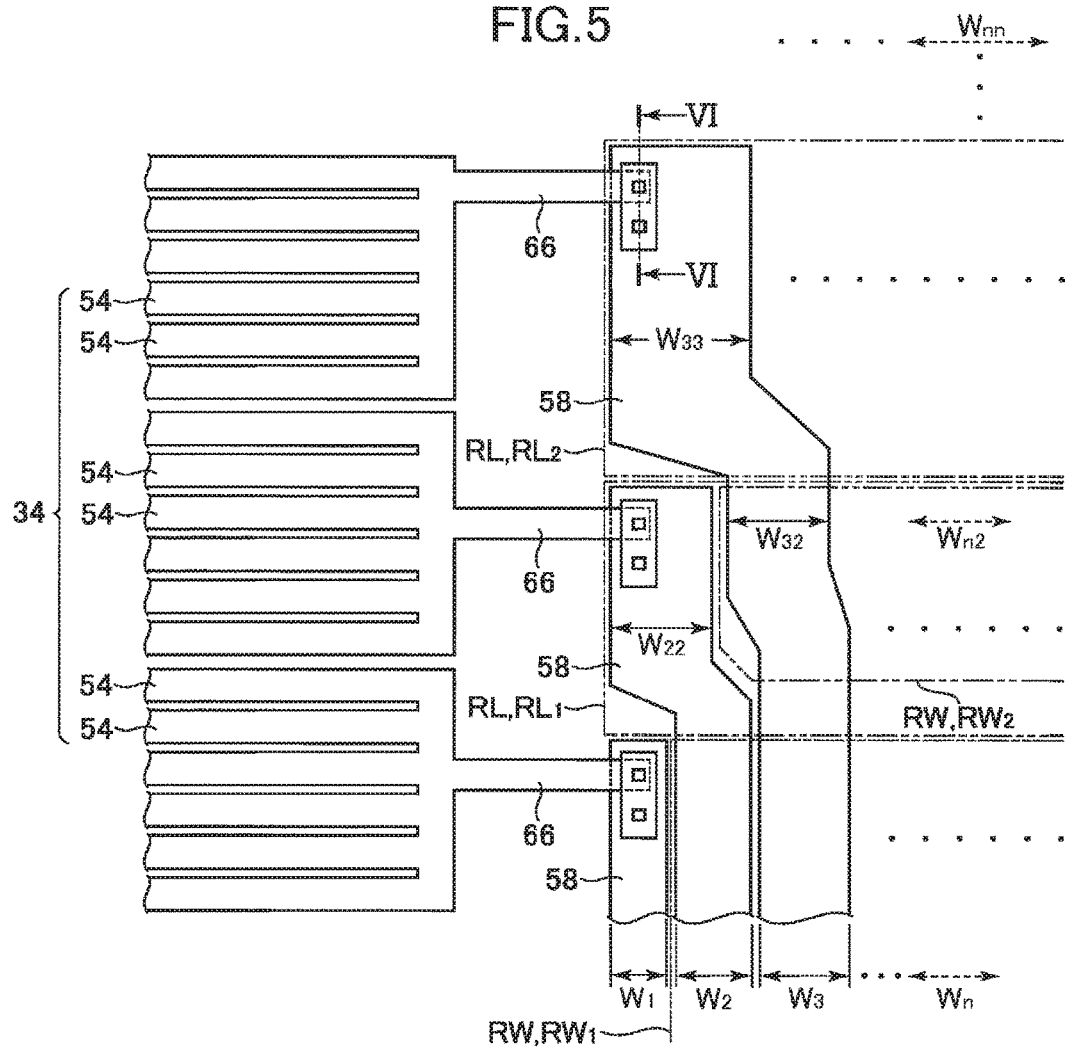
FIG. 5 is a diagram illustrating the details of a common electrode and common lines.
Figure 6:
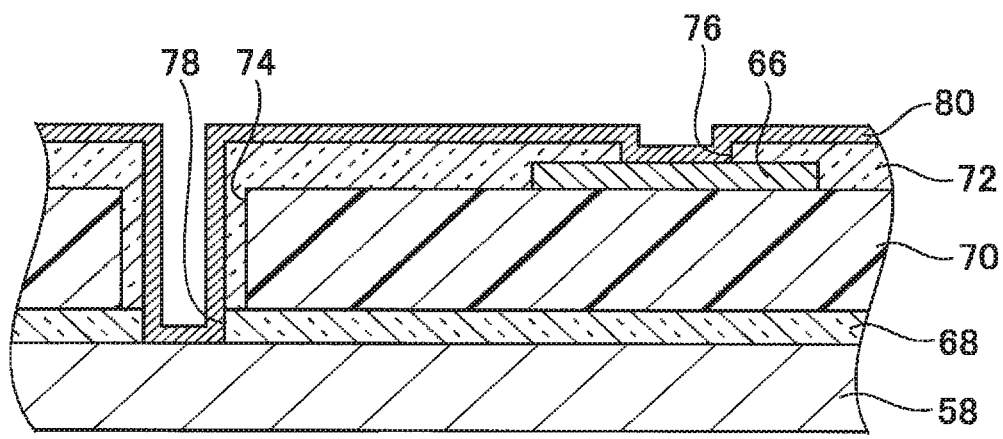
FIG. 6 is a cross-sectional view of the common lines taken along a line VI-VI in FIG. 5.

FIG. 5 is a diagram illustrating the details of the common electrode 34 and the common lines 58. FIG. 6 is a cross-sectional view of the common lines 58 taken along a line VI-VI in FIG. 5.

The common electrode 34 is made of a transparent conductive material such as ITO (indium tin oxide). The common electrode 34 includes the plurality of divided electrode portions 54, and two or more (six in FIG. 5) divided electrode portions 54 are electrically connected to each other. The common electrode 34 includes a connection portion 66 drawn out of the divided electrode portions 54. The connection portion 66 is made of the same material as the divided electrode portions 54, and continuously integrated therewith.

The plurality of common lines 58 made of, for example, metal, is formed on the second substrate 12. As illustrated in FIG. 6, a first inorganic passivation film 68 and an organic passivation film 70 are laminated on the common lines 58 in the stated order. Each connection portion 66 integrated with the divided electrode portions 54 is arranged on the organic passivation film 70. A second inorganic passivation film 72 is so formed as to cover the connection portion 66 and the organic passivation film 70.

The first inorganic passivation film 68 has an opening 78 to which each common line 58 is exposed. The organic passivation film 70 has a through-hole 74 larger than the opening 78 so as to be communicated with the opening 78. The second inorganic passivation film 72 is also formed on an inner surface of the through-hole 74 of the organic passivation film 70, but does not stop the opening 78 of the first inorganic passivation film 68. The second inorganic passivation film 72 has an opening 76 to which the connection portion 66 is exposed.

A conductive film 80 is formed on the second inorganic passivation film 72. The conductive film 80 extends to an inside of the opening 76, and establishes an electric continuity with the connection portion 66. The conductive film 80 extends to an inside of the opening 78, and establishes an electric continuity with the common lines 58. The conductive film 80 extends continuously from the inside of the opening 76 to the inside of the opening 78. The conductive film 80 is made of the same material (for example, ITO (indium tin oxide) as that of the pixel electrodes 30 (refer to FIG. 1), and formed together with the pixel electrodes 30. The common lines 58 and the connection portion 66 are electrically connected to each other by the conductive film 80. The common lines 58 are electrically connected to the common electrode 34 (refer to FIG. 5).

As illustrated in FIG. 5, each of the plurality of common lines 58 is electrically connected to at least one (for example, two or more) of the divided electrode portions 54. Each of the plurality of common lines 58 and at least one (six in FIG. 5) of the divided electrode portions 54 are electrically connected to each other by at least one (one in FIG. 5) connection portion 66.

The plurality of common lines 58 is arranged in an area next to the common electrode 34 in a direction (lateral direction) along which the common electrode 34 extends. The plurality of common lines 58 is arranged next to each other in a width direction orthogonal to a length thereof. As illustrated in FIG. 3, the shortest common line 58*a* is arranged at a side closest to the common electrode 34 in the lateral direction. Also, the longest common line 58*b* is arranged at a side farthest from the common electrode 34 in the lateral direction. The plurality of common lines 58 is more distant from the common electrode 34 in the lateral direction as the length of the common lines 58 is longer (refer to FIG. 3).

As illustrated in FIG. 5, the plurality of common lines 58 each has one end thereof in the area next to the common electrode 34 in the lateral direction (right side in FIG. 5). Each of the common lines 58 extends from the one end in an extension direction (downward in FIG. 5) which is one of the vertical directions. As illustrated in FIG. 3, one ends of the plurality of common lines 58 are positionally displaced in the extension direction (downward in FIG. 5) in the order from the longest common line 58b to the shortest common line 58a.

As illustrated in FIG. 5, in a longitudinal side area RL that is adjacent to one end of an m $(1 \leq m)^{th}$ common line 58 from the shortest common line 58 on an upper side in the extension direction, and extends in a width direction, $(m+1)^{th}$ to $n^{th}$ (n is the number of common lines 58) common lines 58 are arranged in parallel. For instance, in an example of m=1, in a longitudinal side area $RL_1$ that is adjacent to one end of a first common line 58 from the shortest common line 58 on the upper side in the extension direction, and extends in the width direction, second to $n^{th}$ (n is the number of common lines 58) common lines 58 are arranged in parallel. In an example of m=2, in a longitudinal side area $RL_2$ that is adjacent to one end of the second common line 58 from the shortest common line 58 on the upper side in the extension direction, and extends in the width direction, third to $n^{th}$ (n is the number of common lines 58) common lines 58 are arranged in parallel.

In a lateral side area RW that is adjacent to one end of the m $(1 \leq m)^{th}$ common line 58 from the shortest common line 58 in the lateral direction, the $(m+1)^{th}$ to $n^{th}$ common lines 58 are arranged in parallel. For example, in an example of m=1, in a lateral side area. $RW_1$ that is adjacent to one end of a first common line 58 from the shortest common line 58 in the lateral direction, the second to $n^{th}$ common lines 58 are arranged in parallel. In an example of m=2, in a lateral side area RW that is adjacent to one end of the second common line 58 from the shortest common line 58 in the lateral direction, the third to common lines 58 are arranged in parallel.

The longitudinal side area RL is wider than the lateral side area RW in the lateral direction. A difference of the width in the lateral direction between the longitudinal side area RL and the lateral side area RW which are located next to the $m^{th}$ common line 58 is equal to a width of one end of the $m^{th}$ common line 58 in the lateral direction. For example, a difference of the width in the lateral direction between the longitudinal side area $RL_1$ and the lateral side area $RW_1$ which are located next to the first common line 58 is equal to a width $W_1$ of one end of the first common line 58 in the lateral direction.

The plurality of common lines 58 is different in width from each other, and formed so that the width of the common lines 58 is wider as the length thereof is longer. In an example illustrated in FIG. 5, a relationship of $W_1<W_2<\ldots<W_n$ is satisfied.

Except for at least the shortest common line 58, the respective common lines 58 each have a plurality of portions different in width along the length direction. The shortest common line 58 may have a plurality of portions different in width in the length direction, or may not have such portions.

In each of the $(m+1)^{th}$ to $n^{th}$ common lines 58, the width of a portion situated in the longitudinal side area RL located next to the $m^{th}$ common line 58 is wider than the width of a portion situated in the lateral side area RW located next to the $m^{th}$ common line 58.

For instance, in an example of m=1, in the second common line 58, a width $W_{22}$ of a portion situated in the longitudinal side area located next to the first common line 58 is wider than a width $W_2$ of a portion situated in the lateral side area $RW_1$ located next to the first common line 58. Also, in the third common line 58, a width $W_{32}$ of a portion situated in the longitudinal side area $RL_1$ located next to the first common line 58 is wider than a width $W_3$ of a portion situated in the lateral side area $RW_1$ located next to the first common line 58. In the $n^{th}$ common line 58, a width $W_{n2}$ of a portion situated in the longitudinal side area $RL_1$ located next to the first common line 58 is wider than a width $W_n$ of a portion situated in the lateral side area $RW_1$ located next to the first common line 58.

In an example of m=2, in the third common line 58, a width $W_{33}$ of a portion situated in the longitudinal side area $RL_2$ located next to the second common line 58 is wider than a width $W_{32}$ of a portion situated in the lateral side area $RW_2$ located next to the second common line 58.

In the example of FIG. 5, the following expressions are satisfied.

$$W_2<W_{22}, W_3<W_{32}<W_{33}, \ldots, W_n<W_{n2} \ldots <W_{nn}$$

A difference between a total of the widths of portions of the $(m+1)^{th}$ to $n^{th}$ common lines 58 provided in the longitudinal side area RL located next to the $m^{th}$ common line 58, and a total of the widths of portions of the $(m+1)^{th}$ to $n^{th}$ common lines 58 provided in the lateral side area RW located next to the $m^{th}$ common line 58 is equal to the width of one end of the $m^{th}$ common line 58 in the lateral direction.

For instance, in an example of m=1, in the second to $n^{th}$ common lines 58, a difference between a total of the widths $W_{22}, W_{32}, \ldots, W_{n2}$ of portions provided in the longitudinal side area $RL_1$ located next to the first common line 58, and a total of the widths $W_2, W_3, \ldots, W_n$ of portions provided in the lateral side area $RW_1$ located next to the first common line 58 is equal to the width $W_1$ of one end of the first common line 58 in the lateral direction. That is, the following expression is satisfied.

$$(W_{22}-W_2)+(W_{32}-W_3)+ \ldots +(W_{n2}-W_n)=W_1$$

According to this embodiment, since the plurality of common lines 58 is formed so that the width of the common lines 58 is wider as the length thereof is longer, a difference in a resistance value due to a difference in the length can be reduced.

Modified Example

Figure 7:
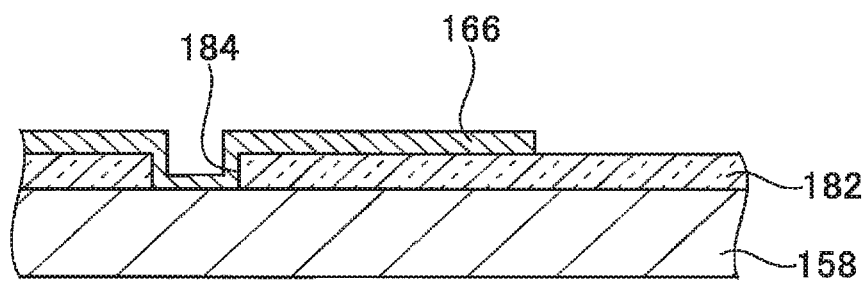
FIG. 7 is a diagram illustrating a modified example 1 in the embodiment of the present invention.

FIG. 7 is a diagram illustrating a modified example 1 in the embodiment of the present invention. In this example, an inorganic passivation film 182 is formed on a common line 158 as an example of the inorganic film. The inorganic passivation film 182 has a through-hole 184 to which the common line 158 is exposed. A connection portion 166 that is a part of the common electrode is formed on the inorganic passivation film 182 so as to establish an electric continuity with the common line 158 through the through-hole 184. The common line 158 is electrically connected to the common electrode by the connection portion 166. This example is a modified example of the structure illustrated in FIG. 6, and the details of the other configurations correspond to those described in the above embodiment.

Figure 8:
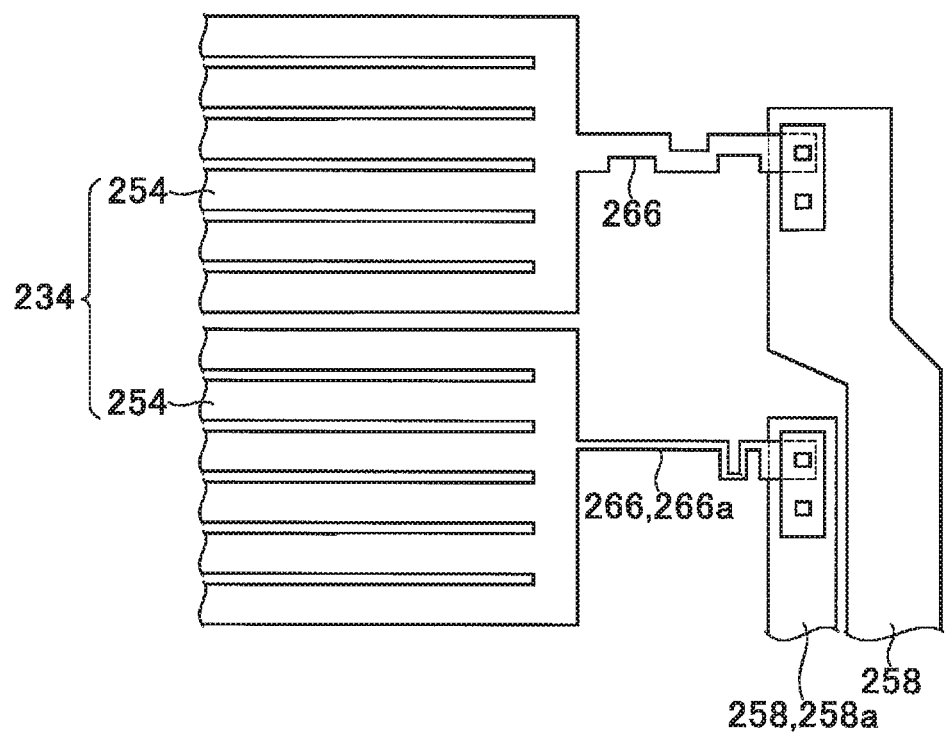
FIG. 8 is a diagram illustrating a modified example 2 in the embodiment of the present invention.

FIG. 8 is a diagram illustrating a modified example 2 in the embodiment of the present invention. In this example, connection portions 266 are thinner as the lengths of common lines 258 electrically connected thereto are shorter. As described in the above embodiment, the common lines 258 are shorter as the common lines 258 are closer to a common electrode 234. A connection portion 266a connected to a common line 258a closest to the common electrode 234 is thinnest. The connection portions 266 are thinner as the common lines 258 electrically connected thereto is closer to the common electrode 234. When the connection portions 266 are thinned, resistance values thereof can be increased. Since the resistance value of the common lines 258 is lower as the length of the common lines 258 is shorter, the connection portion 266a of a high resistance is connected to the common line 258a of a low resistance so that a difference from the resistance values between the other common lines 258 and divided electrode portions 254 can be reduced.

Also, the length of the connection portions 266 is longer as the length of the common lines 258 electrically connected thereto is shorter. The connection portions 266 become lengthened with a bent shape. The length of the connection portions 266 can be changed by changing the bent shape. When the connection portions 266 are lengthened, the resistance value thereof can be increased. Since the resistance value is lower as the length of the common lines 258 is shorter, the connection portion 266a of the high resistance is connected to the common line 258a of the low resistance so that a difference from resistance values between the other common lines 258 and divided electrode portion 254 can be reduced. The details of the other configurations correspond to those described in the above embodiment.

Figure 9:
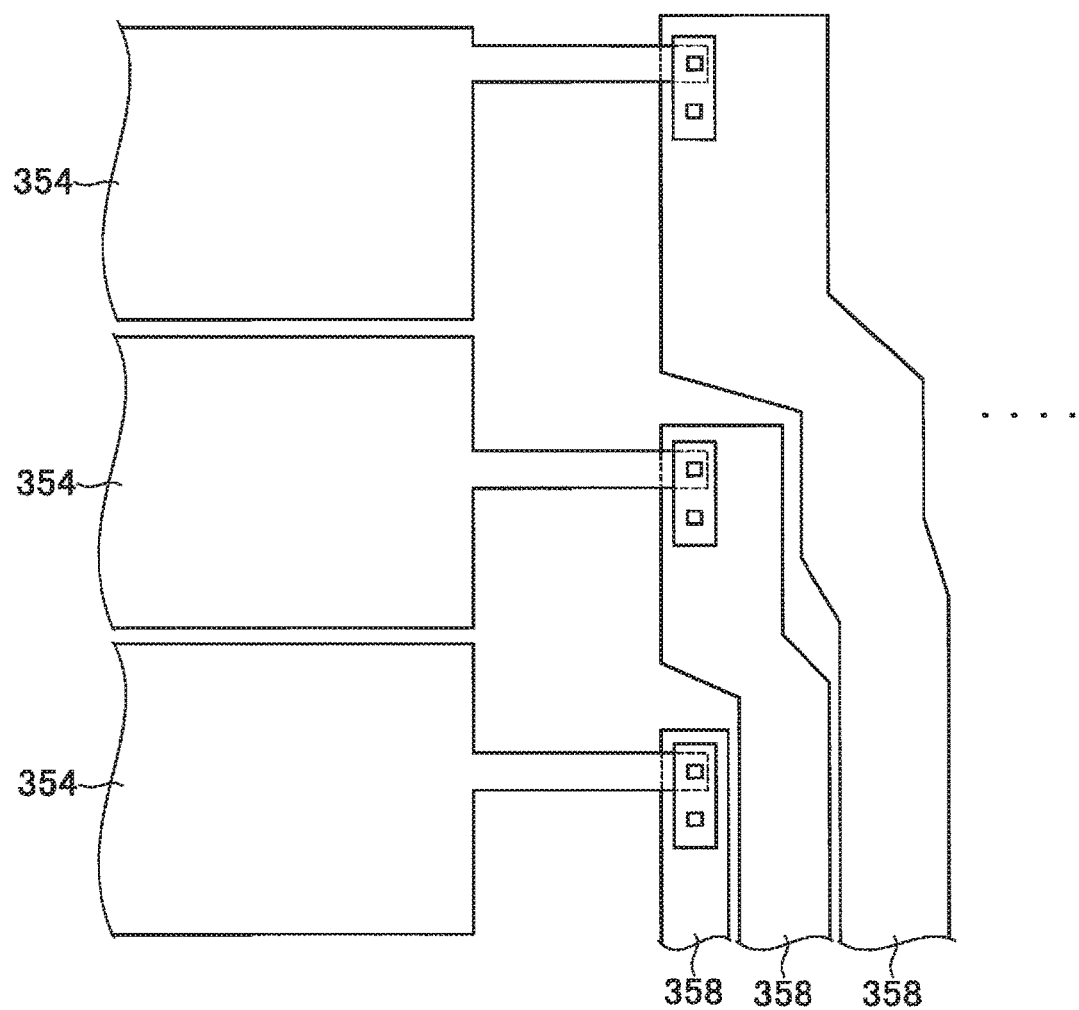
FIG. 9 is a diagram illustrating a modified example 3 in the embodiment of the present invention.

FIG. 9 is a diagram illustrating a modified example 3 in the embodiment of the present invention. In this example, each of a plurality of common lines 358 is electrically connected to one divided electrode portion 354. Alternatively, the divided electrode portions 354 illustrated in FIG. 9 are wider in width than the divided electrode portions 54 illustrated in FIG. 5. Also, one divided electrode portion 354 illustrated in FIG. 9 is shaped to integrate the plurality of divided electrode portions 54 illustrated in FIG. 5 together. The details of the other configurations correspond to those described in the above embodiment.

Figure 10:
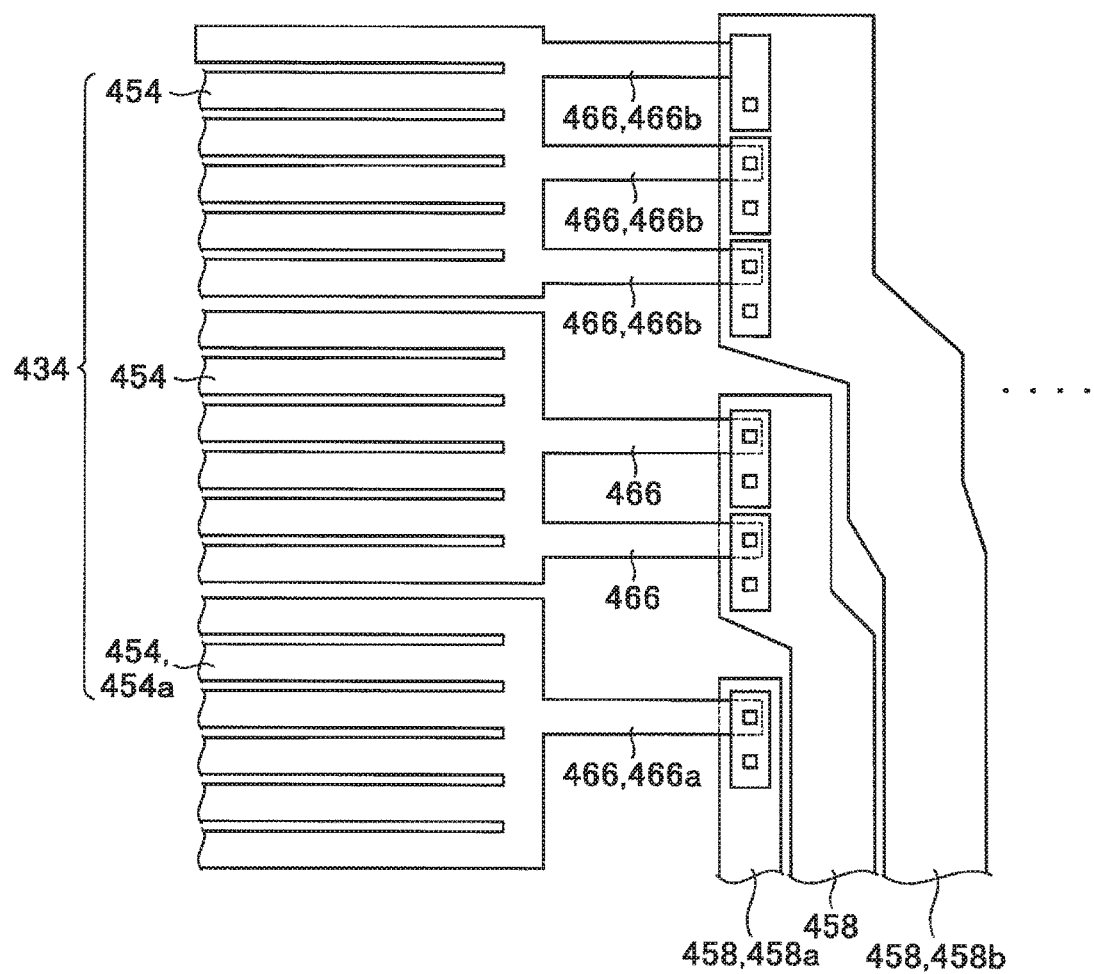
FIG. 10 is a diagram illustrating a modified example 4 in the embodiment of the present invention.

FIG. 10 is a diagram illustrating a modified example 4 in the embodiment of the present invention. In this example, the number of connection portions 466 connected to each common line 458 is larger as the length of the common line 458 is longer. The number of connection portions 466a connected to the common line 458a closest to the common electrode 434 is smallest. The resistance value of the connection portions can be decreased with the increased number of connection portions 466. Since the resistance value of the common line 458 is higher as the common line 458 is longer, a plurality of connection portions 466b low in a combined resistance value is connected to a common line 458b high in resistance so that a difference from the resistance value between the common line 458a and divided electrode portions 454a can be reduced. The details of the other configurations correspond to those described in the above embodiment.

Figure 11:
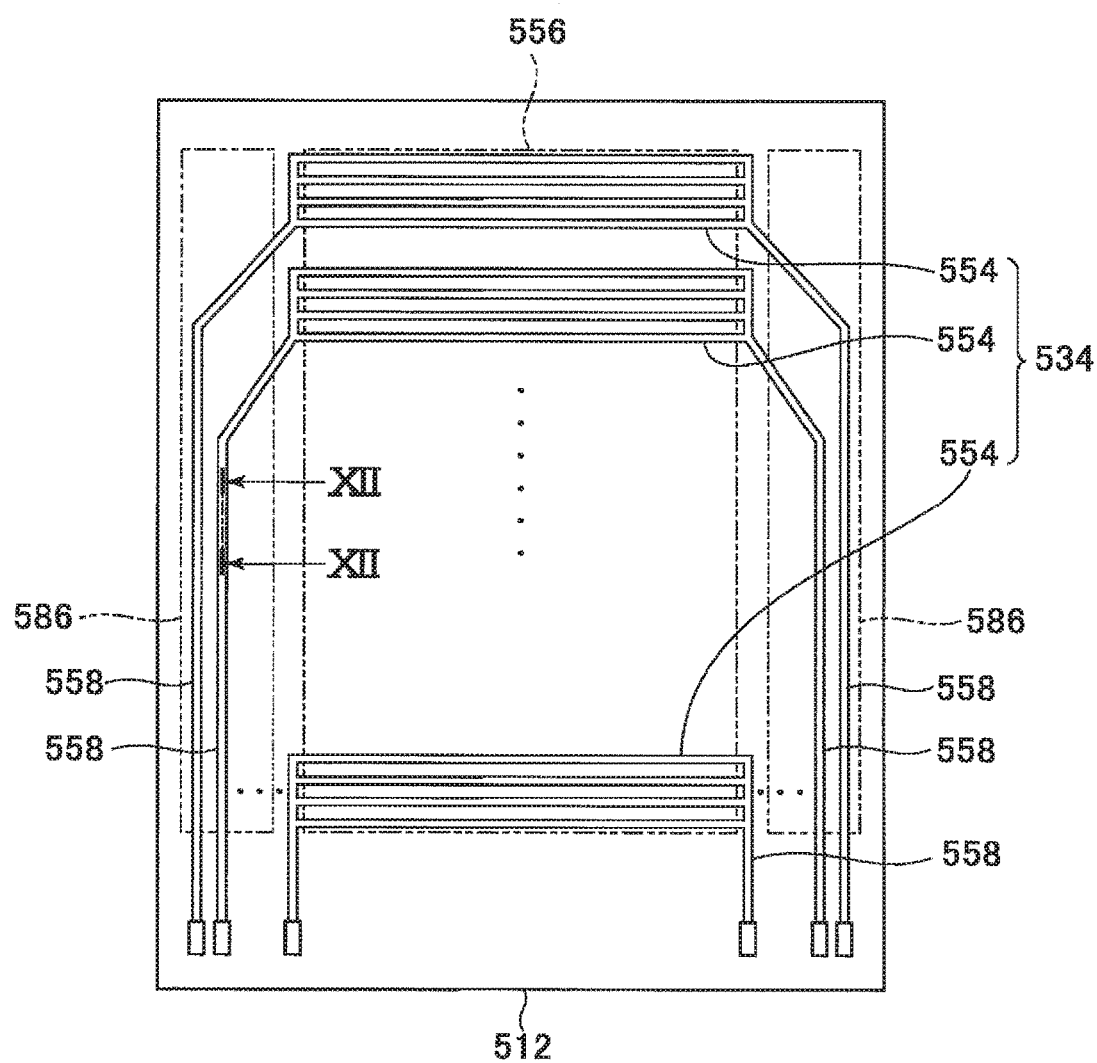
FIG. 11 is a diagram illustrating a modified example 5 in the embodiment of the present invention.
Figure 12:
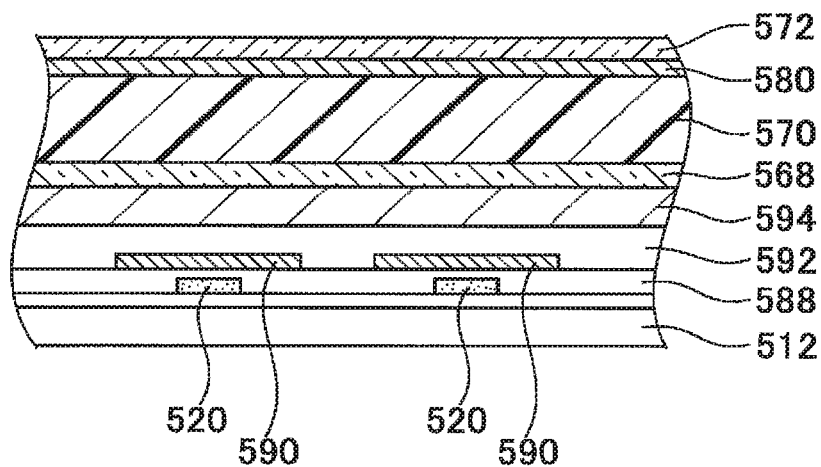
FIG. 12 is a cross-sectional view of the common lines taken along a line VII-VII in FIG. 11.

FIG. 11 is a diagram illustrating a modified example 5 in the embodiment of the present invention. FIG. 12 is a cross-sectional view of the common lines taken along a line XII-XII in FIG. 11. In this example, a second substrate 512 has circuit 586 such as a scanning circuit. The circuit 586 is configured by a film laminated on the second substrate 512. For example, as illustrated in FIG. 12, semiconductor films 520 made of polysilicon or the like are formed on the second substrate 512, and first metal films 590 are formed above the semiconductor films 520 through an insulating film 588. The first metal films 590 configure gate electrodes at position not shown, and a thin film transistor is configured by those laminated films. The circuit 586 includes an active element such as a thin film transistor.

A plurality of common lines 558 is formed to overlap with the circuit 586. For example, an interlayer insulating film 592 is formed on the first metal films 590 configuring the gate electrodes. On the interlayer insulating film 592 is formed a second metal film 594 for configuring the common lines 558. A first inorganic passivation film 568 and an organic passivation film 570 are laminated on the second metal film 594 in the stated order. A transparent conductive film 580 for configuring the common electrode is formed on the organic passivation film 570, and a second inorganic passivation film 572 is formed on the transparent conductive film 580. The transparent conductive fill 580 is made of ITO (indium tin oxide). The details of the other configurations correspond to those described in the above embodiment.

Figure 13:
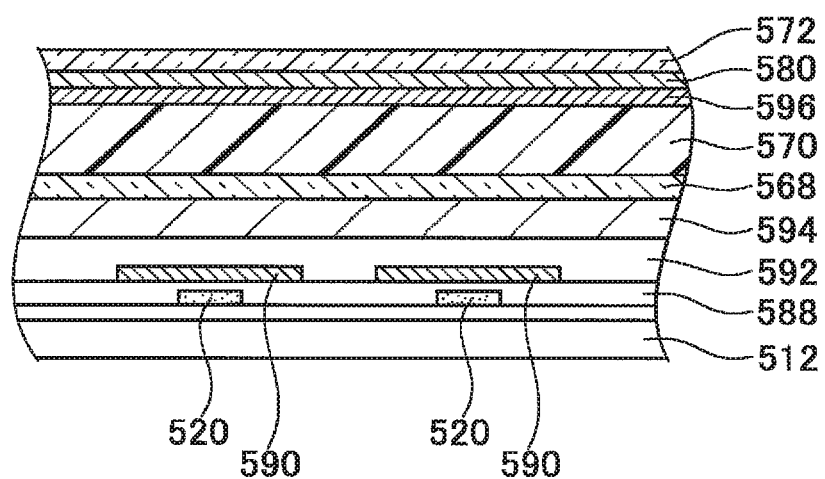
FIG. 13 is a diagram illustrating a structure in which an example illustrated in FIG. 12 is further modified.

FIG. 13 is a diagram illustrating a structure in which the example illustrated in FIG. 12 is further modified. In this example, a metal film 596 is formed in contact with a lower surface of the transparent conductive film 580. The metal film 596 is formed at a position overlapping with the circuit 586 such as the scanning circuit with avoiding an image display area 556 (refer to FIG. 11). A part (for example, connecting portion) of the common electrode 534 configured by the transparent conductive film 580 is located outside of the image display area 556, and the metal film 596 overlaps with that part (connection portion, etc.) to reduce the resistance values between the common lines 558 and the divided electrode portions 554.

Example

Figure 14:
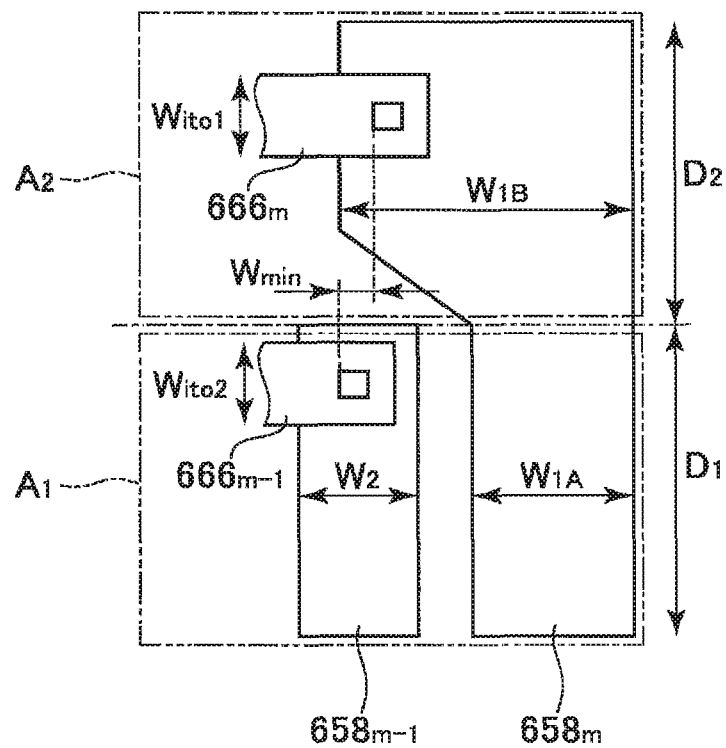
FIG. 14 is a diagram illustrating a resistance value of the common lines.

FIG. 14 is a diagram illustrating a resistance value of the common lines. An end of an $m^{th}$ common line $658_m$, and an end of an $(m-1)^{th}$ common line $658_{m-1}$ from the common line closest to the common electrode not shown are illustrated. The resistance value of the common lines will be described in an example of a first area $A_1$ having a length of $D_1$ to the end of the $(m-1)^{th}$ common line $658_{m-1}$, and a second area $A_2$ adjacent to the first area $A_1$ and having a length of $D_2$ to the end of the $m^{th}$ common line $658_m$.

It is assumed that a width of the $m^{th}$ common line $658_m$ in the first area $A_1$ is $W_{1A}$, and a width of the $m^{th}$ common line $658_m$ in the second area $A_2$ is $W_{1B}$. In the example illustrated in FIG. 14, the second area $A_2$ has a portion smaller in the width than the width. $W_{1B}$, but an increase in the resistance value caused by that portion can be ignored. It is assumed that a width of the $(m-1)^{th}$ common line $658_{m-1}$ in the first area $A_1$ is $W_2$. The common lines $658_m$ and $658_{m-1}$ are made of metal having the same thickness, and their sheet resistances are each $R_{metal}$.

The common lines $658_m$ and $658_{m-1}$ are connected with connection portions $666_m$ and $666_{m-1}$ which are parts of the common electrode, respectively. It is assumed that the connection portions $666_m$ and $666_{m-1}$ are made of ITO (indium tin oxide), and their widths $W_{ito1}$ and $W_{ito2}$ are identical with each other. Also, the connection portions $666_m$ and $666_{m-1}$ are different in length from each other due to a positional displacement of the common lines $658_m$ and $658_{m-1}$. However, it is assumed that a resistance value of a portion of a difference $W_{min}$ in the length therebetween can be ignored, and lengths $D_1$ and $D_2$ of the first area $A_1$ and the second area $A_2$ are each equal to a length D. That is, $W_{min} \approx 0$ $D_1 = D_2 = D$ Under the above conditions, the resistance value $R_m$ of the $m^{th}$ common line 658$_m$ is represented as follows.

$$R_m=\{(D\times R_{metal})/W_{1A}\}+\{(D\times R_{metal})/W_{1B}\}$$

The resistance value $R_{m-1}$ of the $(m-1)^{th}$ common line 658$_{m-1}$ is represented as follows.

$$R_{m-1}=\{(D\times R_{metal})/W_2\}$$

In this example, as compared with a case in which the $m^{th}$ common line 658$_m$ is formed in the second area $A_2$ with the sane width as the width $W_{1A}$ in the first area $A_1$, a resistance value $R_{decrease}$ decreased by enlarging the width of the $m^{th}$ common line 658$_m$ in the second area $A_2$ is represented as follows.

$$R_{decrease}=[\{(D\times R_{metal})/W_{1A}\}+\{(D\times R_{metal})/W_{1A}\}]-[\{(D\times R_{metal}/W_{1A}\}+\{(D\times R_{metal})/W_{1B}\}]=\{(D\times R_{metal})/W_{1A}\}-\{(D\times R_{metal})/W_{1B}\}=D\times R_{metal}\times(1/W_{1A}-1/W_{1B})=D\times R_{metal}\times\{(W_{1B}-W_{1A})/W_A\times W_{1B}\} \quad (1)$$

If the width of the $m^{th}$ common line 658$_m$ is enlarged in the second area $A_2$ by the amount corresponding to the width $W_2$ of the common line 658$_{m-1}$ which is not present in the second area $A_2$, the following expression is satisfied.

$$W_{1B}-W_{1A}\approx W2$$

Therefore, this value is assigned to Expression (1) to obtain the following expression.

$$R_{decrease}=D1\times R_{metal}\times\{W2/(W_{1A}\times W_{1B})\}$$

With use of the above relationship, the first area $A_1$ or the second area $A_2$, or the areas to the terminals (portions where a flexible wiring substrate not shown is connected) of the common line 658$_m$ and 658$_{m-1}$ can be designed so that the resistance values of the adjacent common lines 658$_m$ and 658$_{m-1}$ become equal to each other.

While there have been described what are at present considered to be certain embodiments of the invention, it will be understood that various modifications may be made thereto, and it is intended that the appended claims cover all such modifications as fall within the true spirit and scope of the invention.

What is claimed is:

1. A touch sensor device comprising:
a substrate including a sensing area and a peripheral area around the sensing area;
a touch sensing electrode to which a touch signal is applied for touch detecting, the touch sensing electrode including a plurality of divided electrodes;
a plurality of wirings formed in the peripheral area so as to be electrically connected to the touch sensing electrode, the wirings arranged in a lateral direction and each having an arranged portion;
an insulating layer formed between the wirings and the divided electrodes, the insulating layer having a connecting opening formed above an end portion of each of the plurality of wirings; and
a conductive film formed in the connecting opening and electrically connecting each of the wirings and a corresponding one of the plurality of divided electrodes,
wherein a width of the end portion is greater than a width of the arranged portion in a same one of the wirings, and
the width in the lateral direction of the end portion of a longer one of the wirings is greater than the width of a shorter one of the wirings.

2. The touch sensor device according to claim 1,
wherein the plurality of wirings include a longest wiring and a shortest wiring, and
the plurality of wirings each have the end portion displaced in the order from the longest wiring to the shortest wiring.

3. The touch sensor device according to claim 2,
wherein the shortest wiring is arranged at a side closest to the touch sensing electrode in the lateral direction,
wherein the longest wiring is arranged at a side farthest from the touch sensing electrode in the lateral direction, and
wherein a longer one of the plurality of wirings is more distant from the touch sensing electrode in the lateral direction.

4. The touch sensor device according to claim 2,
wherein except for at least the shortest wiring, the wirings each have a plurality of portions different in width.

5. The touch sensor device according to claim 1,
wherein the substrate further includes a circuit, and
wherein the plurality of wirings is formed to overlap with the circuit.

6. A touch sensing device comprising:
a substrate including a sensing area and a peripheral area around the sensing area;
a touch sensing electrode to which a touch signal is applied for touch detecting, the touch sensing electrode including a plurality of divided electrodes;
a plurality of wirings formed in the peripheral area so as to be electrically connected to the touch sensing electrode, the wirings arranged in a lateral direction and each having a parallel arranged portion;
an insulation layer formed between the wirings and the divided electrodes, the insulation layer having a connecting opening formed above an end portion of each of the plurality of wirings; and
a conductive film formed in the connecting opening and electrically connecting each of the wirings and a corresponding one of the plurality of divided electrodes,
wherein a width of the end portion is greater than a width of the parallel arranged portion in a same one of the wirings, and
the width in the lateral direction of the parallel arranged portion of a longer one of the wirings is greater than the width of a shorter one of the wirings.

7. The touch sensing device according to claim 6,
wherein the plurality of wirings include a longest wiring and a shortest wiring, and
the plurality of wirings each have the end portion displaced in the order from the longest wiring to the shortest wiring.

8. The touch sensing device according to claim 7,
wherein the shortest wiring is arranged at a side closest to the touch sensing electrode in the lateral direction,
wherein the longest wiring is arranged at a side farthest from the touch sensing electrode in the lateral direction, and
wherein a longer one of the plurality of wirings is more distant from the touch sensing electrode in the lateral direction.

9. The touch sensing device according to claim 6,
wherein except for at least the shortest wiring, the wirings each have a plurality of portions different in width.

10. The touch sensing device according to claim 6,
wherein the substrate further includes a circuit, and
wherein the plurality of wirings is formed to overlap with the circuit.

* * * * *